United States Patent Office 3,507,917
Patented Apr. 21, 1970

---

3,507,917
N-BROMINATED-N-CHLORINATED SULFONAMIDES
Laurene O. Peterson, Adrian, Mich. 49221
No Drawing. Continuation of application Ser. No. 482,256, Aug. 24, 1965, and a continuation-in-part of applications Ser. No. 119,756, Apr. 7, 1961, and Ser. No. 143,565, Oct. 9, 1961. This application Aug. 14, 1967, Ser. No. 660,527
Int. Cl. C07c 143/84
U.S. Cl. 260—543   3 Claims This invention is a continuation of application Ser. No. 482,256, filed Aug. 24, 1965, and a continuation-in-part of my copending applications, Ser. Nos. 119,756, filed Apr. 7, 1961, and 143,565, filed Oct. 9, 1961, in turn copending with Ser. No. 593,047, filed June 22, 1956, now U.S. Patent 3,147,259, and Ser. No. 126,403 filed June 14, 1961, now U.S. Patent 3,147,219, and relates to new compounds of aromatic sulfonamides. More particularly, it concerns N-halogenated derivatives containing bromine and chlorine as active components.

Aromatic sulfonamides finding application as parent materials are the sulfonamides of benzene and naphthalene. They are characterized as having one or two sulfonamide radicals, and may also contain one or a plurality of nuclear substituents which are sufficiently unreactive with halogen to permit the formation of a stable N-halogenated compound. The N-hydrogen atoms of the sulfonamide group are substituted by halogen, the resulting compounds containing at least one bromine atom and one chlorine atom. The disulfonamides may substitute a total of four such halogen atoms.

Structurally, the N-halogenated aromatic sulfonamides of this invention have the formula:

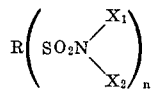

wherein R is a mono- or dicarbocyclic radical which may be substituted with lower alkyl, lower acyl, lower alkoxy, and halogen, $n$ is an integer from 1 to 2; where $n$ is 1, $X_1$ is chlorine and $X_2$ is bromine; when $n$ is 2, $X_1$ and $X_2$ are hydrogen, bromine, chlorine, lower alkyl radical or an inorganic cation, at least one X being bromine and one X being chlorine. Salt formation is possible, where such nucleus contains two sulfonamide groups. Representative compounds of merit are the N-brominated-N-chlorinated derivatives of benzene mono- and disulfonamides, toluene mono- and disulfonamides, and naphthalene mono- and disulfonamides, and carboxybenzenesulfonamides and their salts. These compounds are endowed with the valuable property of providing acive halogen under a variety of conditions, finding applications as bactericides, algicides and fungicides, and also as valuable reagents in chemical synthesis.

In accordance with the present invention aromatic sulfonamides containing varying amounts of active bromine and chlorine are provided. Such compounds may be prepared by reacting the sulfonamide with bromine in aqueous alkaline medium to produce the N-brominated compound and then introducing chlorine to complete the reaction. Alternately the N-bromo-N-chloro derivative may be prepared by treating an all-N-chlorinated sulfonamide with the appropriate amount of a bromide or by admixing an all-N-brominated sulfonamide with an all-N-chlorinated sulfonamide to affect a halogen interchange. Varying amounts of chlorine and bromine may be substituted in the various sulfonamides by controlling the amounts of alkali and halogen added. When the sulfonamide contains more than one —$SO_2NH_2$ group all the N-hydrogen atoms may be substituted with halogen, one or two of the N-hydrogens may remain unsubstituted or a salt may be formed.

The following examples illustrate some of the compounds of the present invention and some of their methods of manufacture.

EXAMPLE 1

Seventeen and one-tenth grams (.1 equiv.) of p-toluene sulfonamide were dissolved in 500 ml. of water containing 12.4 grams (.2 equiv.) of sodium carbonate. The solution was cooled to 15° C. and 8 grams (.1 equiv.) of bromine were added dropwise to the stirred mixture. When all the bromine had been taken up gaseous chlorine was introduced to a final pH of 3.6. The resultant product was removed on a filter, washed and dried. It was pale yellow in color and consisted essentially of p-(N-bromo-N-chloro) toluene sulfonamide. Upon analysis it was found to contain 28% bromine and 12.3% chlorine, and had a solubility in water to provide 18 mgm. per liter of active halogen at saturation.

EXAMPLE 2

Eleven and eight-tenths (.05 mol) of m-benzene disulfonamide were dissolved in 400 ml. of water containing 8 grams (.2 mol) of sodium hydroxide and 5.2 grams (.05 mol) of sodium bromide. The solution was cooled to 15° C. and gaseous chlorine was added to a pH of 5.8. The resulting cream colored product was removed on a filter, washed and dried. It consisted essentially of m-($N^1$-bromo-$N^1,N^{11},N^{11}$-trichloro)benzene disulfonamide, analyzing 19% bromine and 25% chlorine, and provides at saturation in water 18 mgm. per liter of active halogen.

EXAMPLE 3

Twenty and seven-tenths grams (.1 mol) of 2-naphthalene sulfonamide were placed in a 600 ml. beaker to which was added 200 ml. of benzene, and 100 ml. of water containing 8 grams (.2 mol) of sodium hydroxide and 10.3 grams (.1 mol) of sodium bromide. The mixture was stirred to disperse the two liquid phases and chlorine gas was led in to a pH of 5.8. The benzene layer was poured off and evaporated at 50° C. to precipitate the 2-(N-bromo-N-chloro)naphthalene sulfonamide. The product was yellow in color. It analyzed at 10.8% chlorine and 24.6% bromine.

As discussed in U.S. Patent 3,147,219, N-halogenated organic compounds providing both bromine and chlorine have special merit as biocidal agents. The inclusion of the bromine atom enhances the bactericidal properties of these compounds over the all-chloro compounds of the prior art such as Chloramine T. The N-bromo-N-chloro sulfonamides not only release active bromine readily in water, but quite unexpectedly the chlorine moiety also assumes a "free" or "active" form.

The N-halogenated aromatic sulfonamides have certain characteristics which distinguish them from the amides and imides of carboxylic acid as halogen carriers. Because of their generally low solubility in water as shown in the examples, the N-halogenated sulfonamides are particularly valuable in certain areas of water treatment. They provide amounts of active halogen found suitable for many disinfection purposes, yet the free halogen residuals in the water are limited by the low saturation values. For instance, this makes possible the continuous disinfection of potable water by the simple process of depositing a layer of p-N-bromo-N-chloro toluene sulfonamide on top of a filter incorporated in the pumping line.

The sulfonamides further differ from the carboxy amides and imides by being sufficiently acid in character to form salts and become soluble in mild alkali. Such solubility is enhanced when the water contains impurities which react with and remove halogen wherein an alkali metal N-mono-halo compound may result. For instance, N-bromo-N-chloro benzene sulfonamide has a solubility of 0.14% in water, the sodium-N-monochloro- derivative (Chloramine B) a much greater solubility of about 4.7%. Advantage may be taken of this property in the preparation of tablets for the disinfecting of canteen water. To make such tablets quickly and completely soluble a mildly alkaline salt such as sodium borate or even sodium benzoate may be incorporated.

In certain instances it may be desirable to disinfect an oil or an oil-in-water emulsion wherein the disinfectant should have increased oil solubility. Because of the presence of the aromatic ring structure the compounds of this invention are good in this respect. Oil solubility becomes greater as aromaticity increases, that is, with increased number of rings or longer or increased number of alkyl ring substituents. Toluene, xylene, methoxy benzene and the naphthalene derivatives find particular application.

It will be noted that the aromatc sulfonamides containing more than one nuclear substituent can exist as various isomers, and can be made by the methods herein described. Such representative isomers as the ortho, meta and para(N-bromo-N-chloro)toluene sulfonamides have been prepared, all providing active halogen in water but differing somewhat in their physical properties. In the subjoined claims, all such isomers are included.

Representative of the lower alkyl radicals which may be substituted in the aromatic ring are methyl, ethyl, and isopropyl; the methoxy and ethoxy substituents also have merit. The nuclear halogen substituent may be bromine, chlorine or iodine. The carboxybenzenesulfonbromochloramides disulfonamides may be isolated in the form of salts by providing such cation in the reaction medium and discontinuing the chlorination at a pH sufficiently high to form the salt. Typical are the monovalent alkali metal salts of sodium, potassium and lithium, the divalent salts of calcium, magnesium, barium and zinc, the trivalent salts of aluminum, iron and chromium, and the tetravalent salts of tin.

The term "lower" in referring to lower alkyl, lower acyl, and lower alkoxy means such radicals having from one to six carbon atoms.

While several particular embodiments of this invention are shown above, it will be understood that the invention is not limited thereto, since many modifications may be made, and it is contemplated therefore by the appended claims to cover any such modifications as fall within the true spirit and scope of the invention.

Having regard to the foregoing disclosure, the following is claimed as the inventive and patentable embodiments thereof:

1. An N-halogenated sulfonamide having the formula:

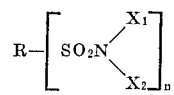

wherein R is a benzene ring, which may be substituted with lower alkyl having from one to three carbon atoms, lower alkoxy having from one to three carbon atoms, bromine, chlorine and iodine groups, and $n$ is an integer from 1 to 2, when $n$ is 1, the $NX_1X_2$ group being NBrCl, and when $n$ is 2 at least one $NX_1X_2$ group being NBrCl, and the remaining $X_1$ and $X_2$ substituents being selected from the group consisting of hydrogen, bromine, chlorine, lower alkyl having from one to three carbon atoms, sodium, potassium, lithium, calcium, magnesium, barium, zinc, aluminum, iron, chromium and tin.

2. An N-halogenated aromatic sulfonamide in accordance with claim 1 wherein R is benzene, and $n$ is 1.

3. An N-halogenated aromatic sulfonamide in accordance with claim 1 wherein R is benzene, $n$ is 2, one $NX_1X_2$ is N-bromochloro, and one $NX_1X_2$ is N-dichloro.

References Cited
UNITED STATES PATENTS 2,495,489    1/1950    Van Andel _____ 260—556
2,171,901    9/1939    Wilson et al. ___ 260—556 XR

OTHER REFERENCES

Chemical Abstracts, vol. 47, col. 12518 (1947) (Abstract of Szydlowskie et al.).

HENRY R. JILES, Primary Examiner

H. I. MOATZ, Assistant Examiner

U.S. Cl. X.R.

260—518; 424—315

PO-1050
(5/69)

UNITED STATES PATENT OFFICE
CERTIFICATE OF CORRECTION

Patent No. 3,507,917　　　　　　　　Dated April 21, 1970

Inventor(s) Laurene O. Paterson

It is certified that error appears in the above-identified patent and that said Letters Patent are hereby corrected as shown below:

Column 1, line 53, "acive" should be -- active --;
Column 3, line 4, "0.14%" should be -- .014% --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents